(12) United States Patent
Garrett et al.

(10) Patent No.: US 9,374,245 B2
(45) Date of Patent: Jun. 21, 2016

(54) OBSERVATION OF THE TRUE CHANNEL FROM BAND-LIMITED FREQUENCY DOMAIN OBSERVATIONS

(71) Applicant: Broadcom Corporation, Irvine, CA (US)

(72) Inventors: David Christopher Garrett, Tustin, CA (US); Nihar Jindal, San Mateo, CA (US); Eric Jon Ojard, San Francisco, CA (US); Alfonso Cano Pleite, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 285 days.

(21) Appl. No.: 14/020,179

(22) Filed: Sep. 6, 2013

(65) Prior Publication Data
US 2015/0036772 A1  Feb. 5, 2015

Related U.S. Application Data

(60) Provisional application No. 61/861,308, filed on Aug. 1, 2013.

(51) Int. Cl.
*H04B 1/38* (2015.01)
*H04L 27/10* (2006.01)
*H04L 25/02* (2006.01)
*H04L 27/26* (2006.01)
*H04B 7/06* (2006.01)

(52) U.S. Cl.
CPC .......... *H04L 25/0204* (2013.01); *H04L 25/022* (2013.01); *H04L 27/263* (2013.01); *H04L 27/265* (2013.01); *H04B 7/0671* (2013.01); *H04L 25/0224* (2013.01)

(58) Field of Classification Search
CPC .. H04L 25/0204; H04L 25/022; H04L 27/263
USPC .................................................. 375/220–222
See application file for complete search history.

(56) References Cited

U.S. PATENT DOCUMENTS

2010/0202301 A1* 8/2010 Wen et al. ..................... 370/252
2014/0050255 A1* 2/2014 Azizi et al. ................... 375/219

OTHER PUBLICATIONS 802.11n Primer, AirMagnet, Aug. 5, 2008, 15 pages.

\* cited by examiner

*Primary Examiner* — Qutbuddin Ghulamali
(74) *Attorney, Agent, or Firm* — Brinks Gilson & Lione

(57) ABSTRACT

A radio device receives a band-limited signal and estimates signal components beyond the band edges to extend the signal and eliminate the band-limited effects. The extended signal is transformed to the time domain to produce an estimate of the true time domain channel.

18 Claims, 6 Drawing Sheets

OBSERVATION OF THE TRUE CHANNEL FROM BAND-LIMITED FREQUENCY DOMAIN OBSERVATIONS

CROSS REFERENCE TO RELATED APPLICATIONS

This application claims priority to provisional application Ser. No. 61/861,308, filed Aug. 1, 2013, which is incorporated by reference in its entirety.

TECHNICAL FIELD

This disclosure relates generally to radio communication devices. More particularly, this disclosure relates to observation of the true radio channel from band limited frequency domain observations of the radio channel.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

Mobile communication devices and other radio devices communicate over radio channels though a transmission medium such as air. To accurately and reliably receive a communicated radio transmission, a receiver develops a channel estimate or channel state information. The channel estimate includes at least magnitude and phase information. More generally, the channel state information describes how a signal propagates from transmitter to the receiver including effects of scattering, fading and power decay with distance. Using the channel estimate or channel state information, the receiver can adapt to current and changing conditions.

DETAILED DESCRIPTION

Figure 1:
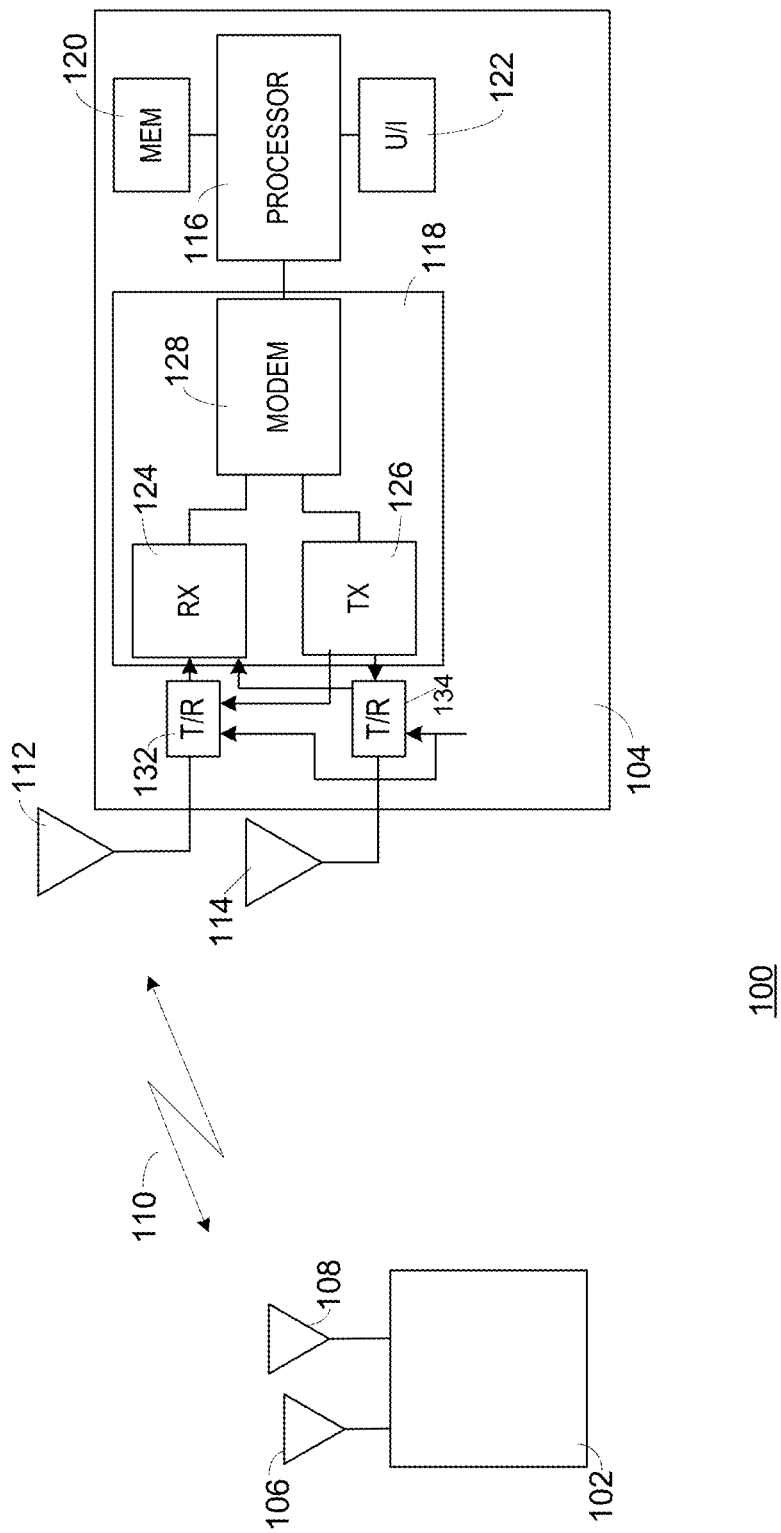
FIG. 1 shows an example of a communication system.

In an exemplary embodiment, a radio transmitter and receiver can use orthogonal frequency division multiplexing (OFDM) for wireless communication in a multiple input, multiple output (MIMO) radio communication system. While the systems and methods described herein may be extended to other examples, one particular application is in a radio system operating in accordance with versions of IEEE 802.11. IEEE 802.11 is a set of radio communication standards published by the Institute of Electrical and Electronics Engineers for wireless communication. In particular, the versions designated as IEEE 802.11n and 802.11ac make use of MIMO and OFDM technologies.

In the 802.11n and 802.11ac OFDM systems, the frequency domain channel is band limited. As a result, it can be difficult for a transmitter or receiver in these systems to get a clear time-domain channel estimate. One solution is to use the transforms that run on the frequency domain channels to produce an estimate of the time domain channel with the band-limited effects on the time-domain channel removed. Once the channel estimate is known in the time-domain, various operations may be performed which are not otherwise available without the time-domain channel estimate.

A cyclic prefix may be used in radio transmissions. A cyclic prefix is the addition of samples to a symbol upon transmission of the symbol. The cyclic prefix serves as a guard interval to limit inter-symbol interference. Some OFDM systems define a series of narrowband tones among the frequency band used for radio communication. For example, in 802.11n and 802.11ac systems, the 20 MHz bandwidth includes 64 smaller frequency bands called subcarriers. In addition there are 40 MHz and 80 MHz bandwidths defined which include 128 and 256 subcarriers respectively. A transmitter broadcasts one or more long training fields which include pilot tones on most subcarriers (i.e. 52 or 56 subcarriers are populated in 20 MHz bandwidth). This allows the receiver to estimate the channel for each of the subcarriers individually. The channel estimation for each of the tones yields information used for demodulation of each of the tones.

The channel estimates for the tones will reflect the variations across the frequency band of the channel. Adjacent tones are relatively correlated. Instead of looking at tones individually, by suitable filtering, localized tones can be grouped and estimated. The estimate of the group yields a much better estimate on a particular tone.

Channel filtering can be done in the frequency domain. A filter operation can be represented as a convolution of a filter response and the channel response. By taking an inverse fast Fourier transform (IFFT), an observation of the channel in time is obtained. The channel can include a line of sight tap, which can be the strongest radio wave to leave the transmitter and be detected at the receiver, plus additional taps due to multipath echoes at delayed times. The IFFT will yield the time domain taps, or the true channel. However, the channel sample presented to the IFFT is band limited. That is, out of 64 tones, only a subset such as 52 or 56 tones are populated properly. Because of the presence of a guard band, the remaining taps are not populated. The IFFT of the detected channel has 52 or 56 tones properly populated and the remaining tones have zero data. The detected channel has the appearance of a channel point-wise multiplied by a square wave window function with some tones having energy present and some tones having zero energy present.

Accordingly, one method to measure the true channel involves extrapolating the guard band to appear as if the channel is cyclic and continuous and not represented by a square wave. The missing tones in the guard band may be filled in with estimations. Further, the frequency domain channel is made circular so that, in effect, the most-negative portion of the frequency domain channel wraps around to meet the most-positive portion of the frequency domain channel. This adaptation of the channel data permits circular convolution in the filters representing the channel using FFT and IFFT pairs.

This estimation may be done for the center carrier or DC tone, plus the guard band tones. In addition, the 802.11ac standard defines a number of pilot tones. The pilot tone can also be extrapolated and filled in as well. The result is that the known channel of 52 or 56 tones can be converted to a fully populated channel of 64 tones.

Upon performing the missing tone estimation, applying an IFFT does provide the true channel. The true channel information can be used to make observations about the static and dynamic nature of the channel and, in turn, those observations can be used to improve the quality of reception.

In one example, an OFDM system incorporates a guard interval in which a copy of data defining the last portion of a symbol is applied to the front portion of the symbol to limit inter-symbol interference. The guard interval is the time between transmitted symbols. The guard interval operates to offset the effects of multipath that would otherwise cause inter-symbol Interference (ISI). Two guard intervals are defined. A long guard interval has a duration of 800 ns, one-fourth of a symbol interval. A short guard interval has a duration 400 ns, one-eighth of a symbol interval. Shorter guard intervals result in more inter-symbol interference if the channel is longer than 400 ns but it increases the overall throughput by reducing guard interval period. The longer guard interval provides ISI protection for longer channels, but also results in unwanted idle time and reduced efficiency. Use of a short guard interval (SGI) boosts data rate by 11 percent while maintaining symbol separation sufficient for most environments.

When channel conditions are satisfactory, the short guard interval will be selected. For channels exhibiting higher inter-symbol interference, the long guard interval will be selected to improve performance. If the guard interval is longer than the channel, there will be no echoes from one symbol to corrupt the next symbol. The guard interval represents overhead in the system but improves performance by reducing inter-symbol interference. The receiver and transmitter may cooperate to dynamically select either the long guard interval or the short guard interval, depending on the true time-domain channel estimate. As noted, the long guard interval is 25% of a symbol and the short guard interval is 12.5% of a symbol duration.

In an exemplary process, channel data for the long training field tones are received. The channel smoothing process is performed on received data and the bandwidth is extended by estimating the missing tones. An IFFT may be taken on the extended channel to give a clear view of the channel. The accurate time-domain channel may be used to adjust and improve the performance of the receiver. In this example, the control system may then be directed to switch from use of a long guard interval to a short guard interval, which represents 12.5% of a symbol interval. The effect is an increase in data throughput over the channel with the same performance and same power dissipation.

Furthermore, the receiver symbol acquisition is trying to maximize the amount of the channel capture within the cyclic prefix region of the OFDM symbol. If the receiver is late in its estimate of the starting point for the OFDM symbol, the ISI protection is reduced, since the early portion of the cyclic prefix (CP) contains no energy. Using the exact channel start time is important for maximizing the effectiveness of the chosen guard interval to protect against ISI. If the symbol timing can be set more accurately, it becomes more likely to use the SGI for channels with moderate tap delays.

One of the artifacts shown in the frequency domain channel OFDM system is that if the acquisition system delays the start of the OFDM, it introduces a group delay to the frequency response, which translates into a phase ramp in the frequency domain response. The phase ramp can complicate the missing tone estimation because even if the adjacent tones are correlated, the phase ramp is rotating the real and imaginary components of the channels. The missing tone estimation filters can be designed to handle the group delay calculation, but the filters can be greatly simplified if the group delay phase ramp can be removed. In this case, the real and imaginary components can be estimated separately.

In addition, as noted, out of the 64 tones of the long training field, only the first part of the cyclic prefix includes energy. Any other detected energy due to a time domain tone after the cyclic prefix is due to noise. Knowledge of the presence of noise can be used to filter the noise that degrades the quality of the channel estimate. The energy in individual taps can be examined and compared with a predetermined threshold value or noise floor. Any taps below the threshold may be filtered. After filtering, an FFT returns a smoothed or filtered version of the original frequency domain channel. However, following filtering, the channel quality is improved since the time domain taps which are noise are filtered, but the significant time domain taps with RF energy are still used in the system. In some cases, the improvement in the channel quality has been measured to be as much as 10 dB on individual tones, which in turn can increase the overall receiver sensitivity by as much as 2 dB.

Furthermore, having a clean version of the time-domain taps can provide information to the user on the multi-path profile. Many different taps are an indication of multipath echoes, and the presence and/or absence of multi-path taps can help the user move to a physical location with a better channel for higher throughput data.

In addition to managing the use of long or short guard interval, additional receiving processing can be used to identify cyclic shift diversity and eliminate its use from the channel. Cyclic shift diversity or cyclic delay diversity (CDD) is a multiplexing technique to transmit a signal from multiple antennas. CDD is a type of delay diversity in which a linear delay is applied on a transmitter's analog front end and antenna, in non-OFDM systems. In CDD, the signal is cyclically and progressively time-shifted with the number of antennas. In CDD, the transmitter transmits time-shifted versions of a waveform from multiple transmit antennas to provide transmit diversity. Generally, the receiver is unaware of the shifted transmissions. Because shifted versions of the channel are received, they look like multi-taps or channel delays. It would be advantageous to remove these CDD-created artificial channel delays on the receiver side when deciding the length of the actual physical propagation channel.

Referring now to the drawing, FIG. 1 shows an exemplary communication system 100. For ease of illustration, the communication system 100 includes in this example only two radio devices, a first radio device 102 and a second radio device 104. In other typical embodiments, the communication system 100 may include any number of radio devices.

Further in this exemplary communication system 100, the two radio devices 102, 104 use multiple input, multiple output (MIMO) radio communication with orthogonal frequency division multiplexing (OFDM) for wireless communication. While the systems and methods described herein may be extended to other examples, one particular application is in a radio system operating in accordance with versions of radio communication standard IEEE 802.11. IEEE 802.11 is a set of radio communication standards published by the Institute of Electrical and Electronics Engineers for wireless communication. In particular, the versions designated as IEEE 802.11n and 802.11ac make use of MIMO and OFDM technologies.

In one example, the radio device 102 is an access point providing wireless access for a local area network including radio devices such as the radio device 104. As the access point, the radio device 102 provides supervisory control of the network and allows radio devices in the network to communicate on the network and, through the access point, to a remote broadband network with access to the internet. For example, the radio device 102 may include or be in data communication with a network interface that communicates with the remote broadband network. For radio communication, the radio device 102 may include a wireless interface including a transmitter and receiver circuitry for radio communication on a wireless network. Communication on the network may be according to a standard such as 802.11n or 802.11ac or any other suitable standard.

The radio device 102 includes antennas 106 and 108 for transmission over a channel 110. The radio device 102 may include any suitable number of antennas; two antennas are shown in this example. The multiple antennas 106, 108 may be used for OFDM MIMO radio communication with the radio device 104. In some embodiments, signals transmitted by the radio device 102 include error control features such as guard intervals and cyclic delay diversity. A guard interval is the time between symbols transmitted by the radio device 102. In an exemplary embodiment, the radio devices 102, 104 may select a long guard interval or a short guard interval depending on conditions in the channel 110. The radio device 102 transmitting to the radio device 104 applies the long guard interval, with a duration of 800 ns, for example, to offset the effects of multipath that would otherwise cause inter-symbol interference. When channel conditions permit, the radio devices 102, 104 may agree to change to a short guard interval, with a duration of 400 ns, for example.

When using cyclic shift diversity or cyclic delay diversity (CDD), the radio device 102 transmits time-shifted versions of a waveform from the multiple antennas 106, 108 to provide transmit diversity. Generally, the receiver, radio device 104, is unaware of the shifted transmissions. Because shifted versions of the channel are received, they look like multi-taps or channel delays to the receiving radio device 104.

The radio device 104 is shown in more detail. In this exemplary embodiment, the radio device includes a control processor 116, a physical layer processor (PHY) 118, memory 120 and a user interface (U/I) 122. The PHY 118 includes radio frequency (RF), analog and mixed signal circuit for communication of radio signals. The PHY 118 may also include digital signal processing circuitry including one or more processors for processing digital data. The PHY 118 serves as a transceiver for communicating radio signals at the antennas 112, 114 with internal data and information with the processor 116.

To that end, the PHY 118 in the exemplary embodiment includes a receiver (RX) 124, a transmitter (TX) 126 and a modem 128. The receiver 124 includes RF circuits and other devices for detection of RF signals in the signals received by the antenna 112. Such circuits in typical embodiments include mixers and oscillators for frequency conversion from RF to baseband frequency. The transmitter 126 includes RF circuits and other devices for driving the antenna 114 to transmit RF signals. Such circuits in typical embodiments include mixers, oscillators and a power amplifier. The modem 128 includes analog, mixed signal and digital circuitry for demodulating received signals to extract data contained therein. Further, for transmission, the modem 128 includes analog, mixed signal and digital circuitry for modulating a signal for transmission by data received from the processor 116 or elsewhere in the radio device 104. The modem 128 may include one or more processors plus data storage elements. The processors may perform functions such as analog to digital conversion, digital to analog conversion, fast Fourier transforms and inverse fast Fourier transforms. In typical embodiments, the components of the PHY 118 may be implemented in any combination of circuits, logic components, processors including digital signal processors and software.

A first transmit/receive switch 132 and a second transmit/receive switch 134 are controlled so that the antennas 112, 114 are shared between the transmitter 126 and receiver 123 modes of the radio device 104.

The processor 116 includes circuitry which controls the overall operation of the radio device 104. The processor 116 may include one or more processors including special purpose processors such as speech coders and general purpose processors. The processor 116 may also include circuitry such as clocking and timing circuitry for control and supervision of the operation of the radio device 104.

The memory 120 stores data and instructions for use by the processor 116 and for other components such as the modem 128. The memory may include various memory technologies such as flash memory, static memory and dynamic memory.

The user interface 122 includes components to provider interaction between the radio device 104 and the user of the radio device 104. The user interface 122 typically includes a display for visual display of information, a keypad for data entry and a microphone, speaker and other audio processing equipment. In some examples, the radio device 104 is a handheld device such as a smartphone or radiotelephone. In other examples, the radio device 104 is a portion of a larger system such as a laptop or personal computer. The embodiments shown in FIG. 1 are intended to be exemplary only.

Figure 2:
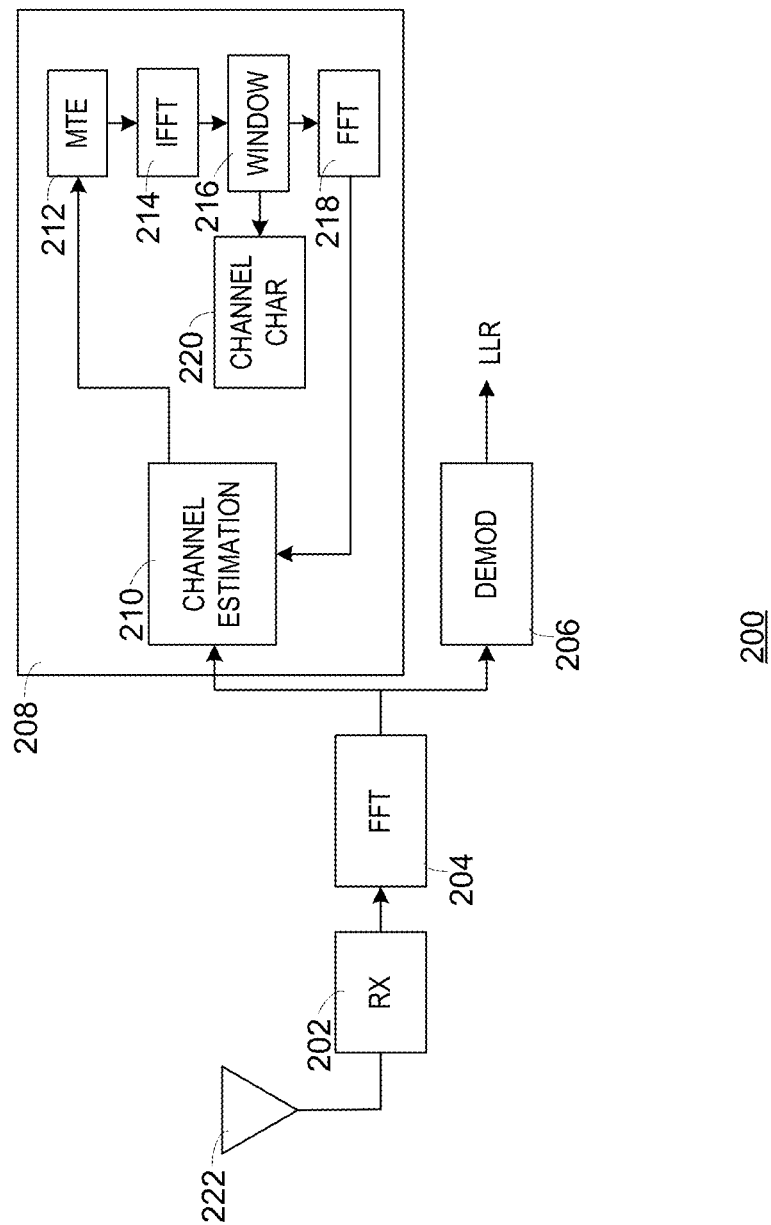
FIG. 2 is an example of a receive circuit of a radio device.

FIG. 2 shows an example demodulator in a receiver circuit 200 for an OFDM system. The receiver circuit 200 includes a radio frequency receiver 202 coupled to an antenna, a fast Fourier transform (FFT) module 204, a demodulator 206 and a channel estimation module 208. The receiver circuit 200 may be used for detecting and demodulating radio frequency signals received at an antenna 222. In one example, the receiver circuit 200 is configured to receive OFDM signals. In a particular embodiment the receiver circuit 200 is configured to receive signals transmitted by a remote radio in accordance with a radio air interface standard such as IEEE 802.11n or 802.11ac. The received radio frequency signals include supplemental information or energy to improve the reliability or accuracy of the receiver circuit 200, such as pilot tones. This supplemental information may be used for timing and channel estimation.

The receiver 202 detects radio frequency (RF) energy received by the antenna 222 and produces time domain signals. This process may include frequency conversion and analog to digital conversion. After the front-end radio frequency receive (RF RX) processing by the receiver circuit 202, the FFT module 204 converts the time domain signal into the frequency domain subcarriers. For example, when processing an 802.11n or 802.11ac packet, such a packet will be transmitted with a long training field which includes a predefined group of subcarriers including pilot channels. The subcarriers are used to form the channel. In addition, the pilots may be used to update and track the channel.

The channel estimation module 208 includes a channel estimator 210, a missing tone estimator 212, an inverse fast Fourier transform module 214, a window function 216 and a FFT module 218 and a channel characterization block 220. Each of the components of the channel module 208 may be implemented in any suitable combination of circuitry, digital logic including digital signal processors, memory and software.

Within the channel estimation module 208, the missing tone estimator (MTE) 212, IFFT module 214, window function 216, and FFT module 218 may be used to smooth out the example channel. The channel characterization block 220 may be operative to analyze the characteristics of the channel. For example, as will be discussed in greater detail below, the channel characterization block 220 may be configured to provide for selection of either short guard interval (SGI) or long guard interval (LGI) or cyclic delay diversity (CDD) analysis.

The demodulator 206 receives the frequency domain channel information from the FFT module 204 and demodulates the received information. The demodulator 206 computes the log likelihood ratio (LLR) and forwards this information to a channel decoder to decode the payload of the received packet.

Figure 3:
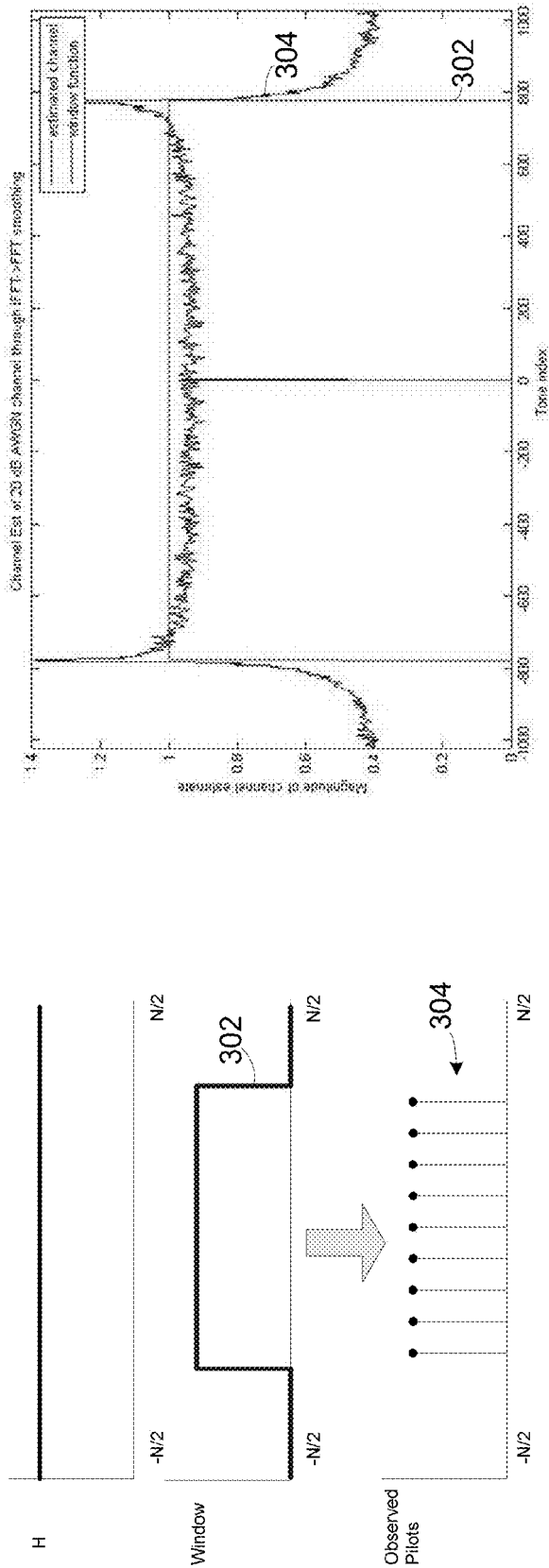
FIG. 3 is an example of signal processing in a demodulator.

FIG. 3 is an example of signal processing in a demodulator. On the left hand side of FIG. 3 is shown the true channel H in the frequency domain. The channel extends across a range of frequencies from [−N/2, N/2−1]. Because of band-limiting, only a window of the channel H is conveyed as indicated by the square wave window function 302. The window function is typically defined by the wireless standard since not all the subcarriers are populated with energy. In the case of 20 MHz 802.11ac packets, only 56 of the 64 subcarriers are observed. This operates like the windowing function of FIG. 3 so that only a few pilot tones are actually observed. No information is available outside the window. The result on the lower left of FIG. 3 is a series of channel taps 304.

If an IFFT process with a window function to remove noise except for the individual time domain taps is passed back through the FFT process on a signal with the properties of the square wave signal, the signals displayed on the right hand side of FIG. 3 will result. The right hand side of FIG. 3 shows the window function and the estimated channel 304 that results from an IFFT process. Because of the attempt to process the sharp-edged window function, the filtering tries to go from band edge and down to the guard band along with a large spike on either end of the band. The signal is severely distorted by the effect of the window function. FIG. 3 also shows that the center tap, at DC or tone index 0, is not included or is missing in the tones received by the demodulator.

Figure 4:
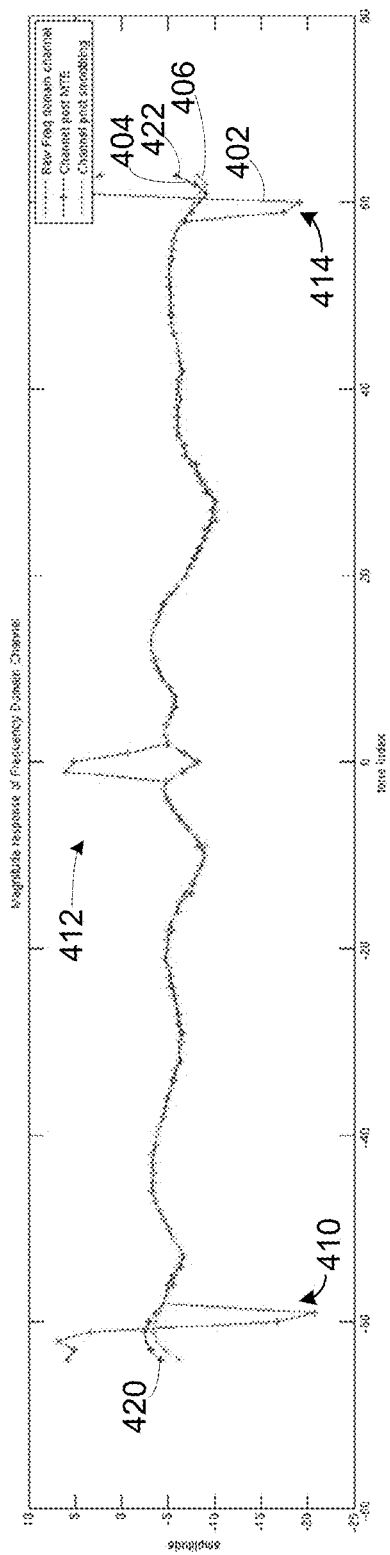
FIG. 4 is an example of a demodulated signal in the frequency domain.

FIG. 4 is an example of a demodulated signal in the frequency domain on a 128-subcarrier frequency domain signal, as used in a 40 MHz 802.11ac packet.

FIG. 4 shows a plot of signal amplitude versus tone index. In FIG. 4, three signals are shown, including a raw frequency domain channel 402, the channel after missing tone estimation 404 and the channel after smoothing 406.

The raw frequency domain channel 402 includes random data with some missing tones including a DC tone at tone index 0. Moving from the raw frequency domain channel 402 to channel 404 reflects the operation of missing tone estimation to be described in greater detail below.

The missing tone estimation process includes two featured operations. First, missing tones or frequency components are estimated and added back to the frequency domain signal. For example, the raw frequency domain channel 402 includes in this example three discontinuities, including a first spike 410, a second spike 412 and a third spike 414. The discontinuities result from processing a received input signal that is missing tones at those corresponding locations. Following a missing tone estimation process, the channel 404 results. In channel 404, the spikes 410 and 414 at the right and left ends, respectively, of the frequency band, are smoothed. Further, the spike 412 at center tone index 0 is smoothed as well. Some error is introduced by the smoothing process, but the net result is a more consistent channel signal which is much closer to representing the true channel.

Second, at the ends of the band, indicated by tone indices −64 and +63, the ends of the raw frequency domain channel are smoothed or made continuous. In a sense, the channel is made circular so that a left end 420 of the signal 402 is made to match up in magnitude with the right end 422 of the signal 402. Put another way, after the missing tone estimation process, the magnitude of the processed channel at the most-negative tone index matches the magnitude of the processed channel at the most-positive tone index, with no spikes or sudden variations in the channel magnitude across the band.

The channel 406 after smoothing shows that tone-to-tone degradation has been removed. Again, some error is introduced by the smoothing process but the overall resulting channel is a very close estimate to the true channel.

Figure 5:
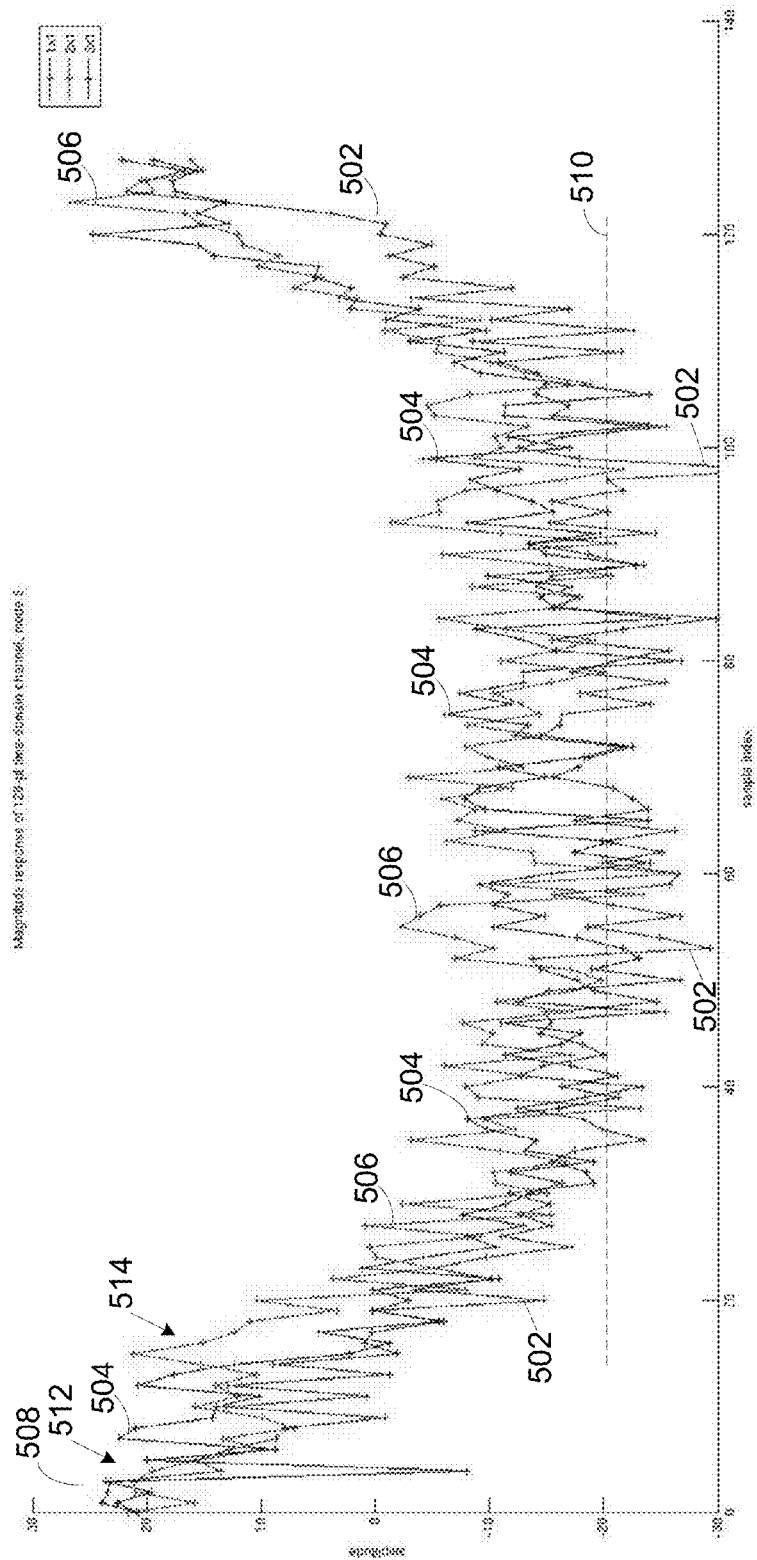
FIG. 5 is an example of a demodulated signal in the time domain.

FIG. 5 is an example of a demodulated signal in the time domain. FIG. 5 shows a time domain capture of the demodulated signal. In FIG. 5, three exemplary signals are show. Signal 502 is the demodulated signal of a 1×1 system, meaning a system where the signal was transmitted by the transmitter with 1 antenna and received at the receiver with 1 antenna. Signal 504 is the demodulated signal of a 2×1 system, meaning a system where the signal was transmitted by the transmitter with 2 antennas and received at the receiver with 1 antenna. Signal 506 is the demodulated signal of a 3×1 system, meaning a system where the signal was transmitted by the transmitter with 3 antennas and received at the receiver with 1 antenna.

In FIG. 5, the abscissa is sample index so that samples further to the right are delayed in time. Initially, near sample index zero, with little delay, there is a strong tap 508 at amplitude approximately 25 dB. Signal 502 includes several additional echoes or taps of decreasing energy and delay. At about −20 dB, a noise floor 510 is reached. Below the noise floor, the signal is only noise due to tone-to-tone variations. The noise may be filtered to improve signal to noise ratio and reliability and accuracy in demodulation of the signal.

Signal 504 illustrates 2×1 CDD. A signal is transmitted from a first antenna at the transmitter and real time copy of the signal is transmitted from a second antenna at the transmitter. The received signal is evident in FIG. 5. A tap 512 from the first-transmitted signal is followed in time by a tap 514 from the second-transmitted signal at about the same magnitude, approximately 23 dB. Detection of these taps allows the demodulator to conclude that the transmitter is using CDD for transmission. Further signal processing can be modified using the knowledge that CDD is in place.

The information in FIG. 5 allows the power delay profile of the channel to be calculated. Power delay profile corresponds to the duration of the channel. The power delay profile gives the intensity of a signal received over a multipath channel as a function of time delay. The time delay is the difference in travel time between multipath arrivals at the receiver. The power delay profile can be used to determine additional information about the channel or environment.

The information in FIG. 5 can also be used to determine if a short guard interval may be used. The guard interval serves to limit inter-symbol interference. In some instances, a short guard interval may be used to increase throughput and efficiency of data communication. For example, in 801.11 ac systems, the long guard interval is 800 ns long and the short guard interval is 400 ns long. Therefore, if the channel length is no longer than 400 ns, having no significant energy beyond 400 ns, the short guard interval may be used. The information of FIG. 5 allows the channel length to be determined. Every sample in this example is 25 ns.

If the demodulator determines that a short guard interval may be used, the radio device including the demodulator may negotiate with the radio on the other end of the channel to switch to use of a short guard interval. The channel is reciprocal, so the short guard interval may be used by both radios. Similarly, if the channel delay changes due to changing conditions, so that a long guard interval should be used, the radios may negotiate the change. In this manner, the use of guard intervals may be adapted to a changing environment.

The information in FIG. 5 can also be used to determine a noise plus interference estimation. A more accurate estimation may be obtained, for example, by averaging power to isolate noise power in the section of the time-domain where the signal is not present. For example, energy between taps 50 to 90, which the receiver has identified to be pure noise samples, can be averaged to estimate the noise power of the system.

Figure 6:
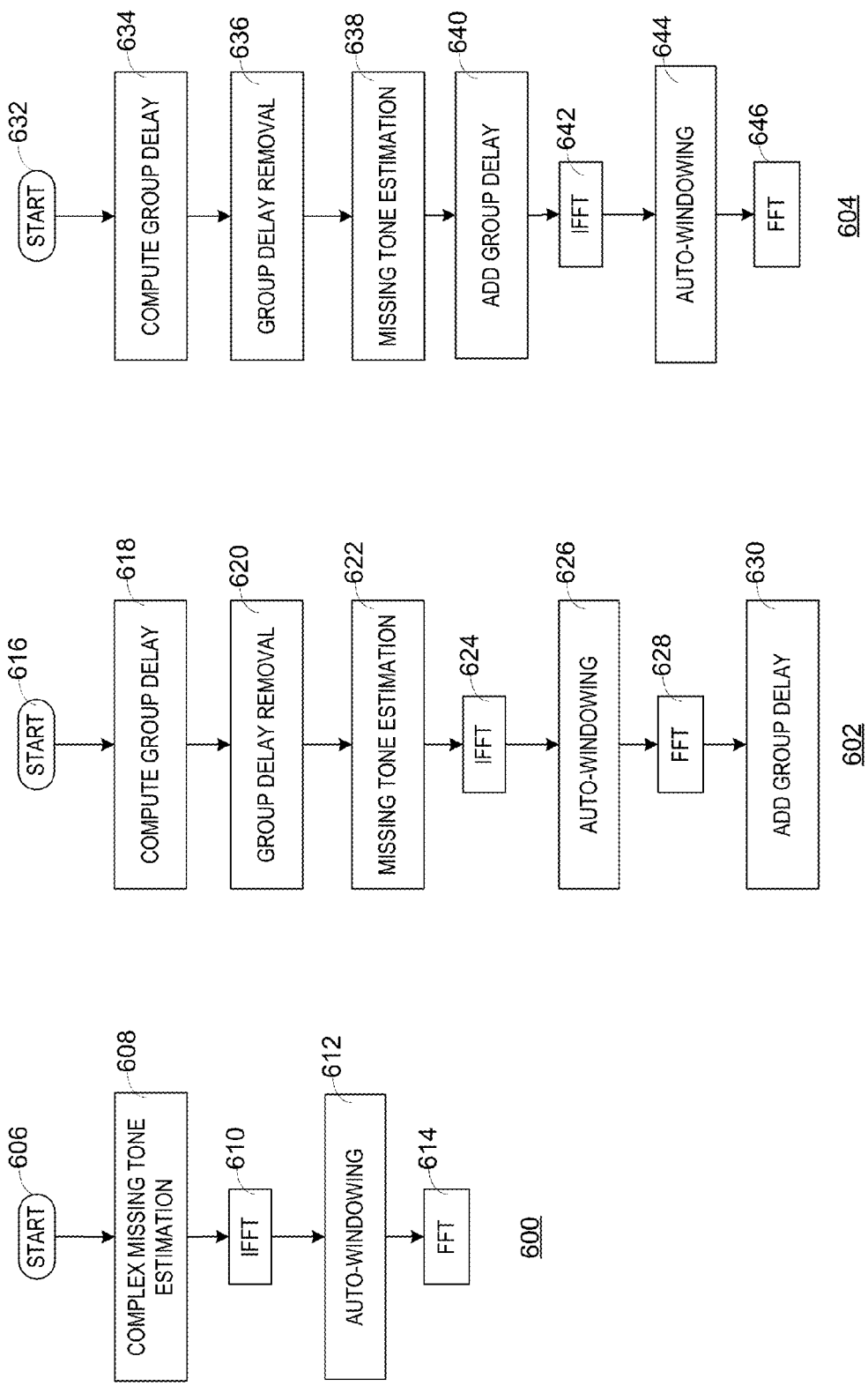
FIG. 6 is a flow diagram illustrating signal processing in a demodulator.

FIG. 6 is an exemplary series of flow diagrams illustrating signal processing in a demodulator. The processes of FIG. 6 may be used on a received signal to smooth the received signal, in particular where the signal is band limited or has missing tones or pilots the affect quality of signal demodulation. The processes of FIG. 6 represent alternatives for missing tone estimation in a radio device of the type illustrated above in conjunction with FIGS. 1 and 2.

A first process 600 begins at block 602. A complex missing tone estimation is performed. The missing tone estimation process involves identifying tones which are missing due to band limiting and other reasons. Then, a linear combination of neighboring tones may be determined. In the frequency domain, using information about the known correlation between neighboring tones, linear combination coefficients are derived to develop a formula for the missing tone estimation. For example, four tones to both the left and right (in the frequency domain) of the missing tone may be combined to estimate the missing tone. For a missing tone in the center of the band (such as the DC tone), fewer adjacent tones may be used to interpolate the value of the missing tone than are used for a missing tone at the end of the band. Similarly, a single missing tone may be estimated with fewer adjacent tones than multiple adjacent missing tones. The complex missing tone estimator may operate separately on the real and imaginary components of the frequency-domain channel, or it may operate on a polar representation (amplitude and angle) of each complex channel coefficient, or the estimator may implicitly or explicitly estimate any phase ramp that appears in the tones used in the linear combination and then suitably remove the effect of that phase ramp.

At block 610, an inverse fast Fourier transform (IFFT) process is performed to convert to the time domain. The result is an accurate estimate of the channel. At block 612, an auto-windowing function is performed, whose objective is to (1) use the noisy estimate of the time domain channel to attempt to estimate which portions of the impulse response are pure noise (to be later filtered) versus portions that contain meaningful signal taps plus noise, and (2) filter taps which are estimated to be purely or mostly noise (filtering refers to removing or partially removing a tap, either by setting the tap to zero or by reducing its amplitude). At block 614, a fast Fourier transform is performed to transform to the frequency domain.

An alternative process 602 begins at block 616. At block 618, the group delay is calculated. The received tones are complex in nature. Group delay is the delay of the whole signal. Group delay increases variation from tone to tone and introduces a phase ramp on the adjacent subcarriers in the frequency domain. When averaging two adjacent tones, for example, with group delay present the averaging is not as good since the filtering needs to account for the complex rotations between subcarriers. The group delay of the signal is computed and, at block 618, removed or shifted to zero delay. With no group delay present, the missing tones are easier to calculate. The residual phases are the missing channel information as opposed to delay.

At block 622, the missing tone estimation process is performed. As noted above, this process involves identifying missing tones. A linear combination of neighboring tones may then be determined to estimate the missing tones. In the frequency domain, linear combination coefficients are derived to develop a formula for the missing tone estimation. For example, four tones to the left and right (in the frequency domain) of the missing tone may be combined to estimate the missing tone. For a missing tone in the center of the band (such as the DC tone), fewer adjacent tones may be used than for a missing tone at the end of the band. Similarly, a single missing tone may be estimated with fewer adjacent tones than multiple adjacent missing tones.

At block 624, an inverse fast Fourier transform is performed to transform to the time domain. The result is an accurate estimate of the channel. At block 626, an auto-windowing function is performed. At block 628, a fast Fourier transform is performed to transform to the frequency domain. At block 630, the previously-calculated group delay is added back in.

An alternative process 606 is also shown in FIG. 6. In the exemplary process 606, after the missing tone estimation has been calculated, the group delay can be added back into the signal before proceeding through the IFFT, auto-windowing, and FFT filtering. Thus, in block 634, the group delay is calculated and in block 636, the group delay is removed. At block 636, the missing tone estimation process is performed. The missing tone estimation process of block 636 may be similar to the missing tone process of block 622 described above. At block 640, the group delay is added back to the signal data. At block 642, an IFFT process is performed to transform data back to the time domain, an auto-windowing process is performed in block 644 and the data is transformed back to the frequency time domain in an FFT process, block 646.

The process illustrated in FIGS. 1-6, and the information gained from the process, may be used to improve radio performance. For example, channel timing may be determined with high precision. This precise channel timing may be used to adjust modem timing to better capture the full channel with the cyclic prefix or other information. For example, if channel timing at the receiver of the radio is off relative to channel timing at the remote transmitter, the modem of the radio may begin searching for the cyclic prefix at the wrong time, possibly missing some portions of the cyclic prefix. By using the channel timing, the modem timing may be dynamically adjusted as conditions in the channel change, for example, due to changing channel quality or movement of the radio.

Similarly, once the estimate of the true time domain channel is available after completion of the process described herein, the radio may automatically respond by varying its operation to improve the reception or transmission of information by the radio. For example, awareness of channel conditions developed by the illustrated method may allow the radio to vary the modulation of subsequently-transmitted signals to a remote radio. Similarly, an alternative coding scheme may be selected based on the awareness of channel conditions. If the channel is determined to be lossy or noisy above a threshold, a more robust coding scheme may be selected to reduce error rate and improve reliability.

In another example, the estimate of the true time domain channel may be used to identify the presence of multipath channels at the receiver of the radio. For example, multipath channels vary in timing of their reception at the receiver and are generally not detectable in the frequency domain, other than as additional energy at a particular frequency. Once the radio becomes aware of the multipath signals, the radio may use that information to produce a multipath detection indication. For example, the radio may adjust its own timing or filtering in response to the multipath detection indication. Alternatively, the radio may provide a multipath indication to a user of the radio. The multipath indication to the user may be some indication through a user interface of the radio. The indication may be audible, played through a speaker for the user to hear. Or the indication may be visual such as an illuminated indicator or message on a display of the radio. The indication may provide to the user the information that the radio is subject to multipath channels so that the user may respond by moving to a new location or orientation to reduce the multipath reception at the radio.

From the foregoing, it can be seen that the present disclosure provides a method to observe the true time domain channel from reception of a band limited frequency domain channel at a radio. A series of tones is received at the radio. Due to band limiting or other factors, the series of tones may not be fully populated so that some information is lost. The received series of tones may be supplemented to be fully populated. For example, one or more tones may be added at one or both ends of the frequency band. Missing intermediate tones may be filled into to create a full complement of tones. The missing tones may be estimated using a combination of adjacent tone values, for example by interpolating or extrapolating a known tone value to derive a value for a missing tone. The estimated tone values will be estimates only but inclusion of estimated values will improve the estimate of the true time domain channel.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method comprising:
at a radio,
   receiving frequency waveforms transmitted by a remote radio over a radio channel, the frequency waveforms including band-limited observations of a range of frequencies;
   receiving a sequence of tones forming a portion of the range of frequencies;
   estimating missing portions of the frequency waveforms to produce a circular waveform, including locating missing tones in the received sequence of tones and determining a linear combination of neighboring tones to estimate a replacement tone for each located missing tone; and
   transforming the circular waveform to produce a signal representing the radio channel in time domain.

2. The method of claim 1 wherein estimating the missing portions of the frequency waveforms comprises:
   extending ends of the received sequence of tones to produce the circular waveform that is continuous beyond the range of frequencies.

3. The method of claim 1 wherein transforming the circular waveform comprises taking an inverse fast Fourier transform of the circular waveform to produce the signal representing radio the channel.

4. The method of claim 1 wherein transforming the circular waveform comprises identifying all time domain taps in the channel.

5. The method of claim 1 further comprising:
using the signal representing the radio channel, selecting usage of one of a short guard interval and a long guard interval.

6. The method of claim 1 further comprising:
determining from the received frequency waveforms channel timing for the radio channel; and
adjusting timing of the receipt of subsequent frequency waveforms using the determined channel timing.

7. The method of claim 1 further comprising:
adjusting demodulation of subsequent frequency waveforms using the signal representing the radio channel in the time domain.

8. The method of claim 1 further comprising:
adjusting decoding of subsequent frequency waveforms using the signal representing the radio channel in the time domain.

9. The method of claim 1 further comprising:
determining from the received frequency waveforms presence of multipath channels; and
providing a multipath indication to a user of the radio.

10. The method of claim 1 further comprising:
using the signal representing the radio channel, determining the frequency waveforms were transmitted by the remote radio using cyclic delay diversity.

11. A radio device comprising:
receiver circuitry configured to receive frequency waveforms including a sequence of tones transmitted by a remote radio over a radio channel; and
estimator circuitry configured to identify and estimate missing portions of the received frequency waveforms to produce a circular waveform, including locating missing tones in the sequence of tones and determining a linear combination of neighboring tones of the located missing tones to estimate a replacement tone for each located missing tone; and
transformation circuitry operative to transform the circular waveform to produce a channel estimate for the radio channel in time domain.

12. The radio device of claim 11 wherein the transformation circuitry comprises an inverse Fast Fourier Transform module operative to process the circular waveform to produce the channel estimate for the radio channel in the time domain.

13. The radio device of claim 12 wherein the inverse Fast Fourier Transform module is operative to identify all time domain taps in the radio channel.

14. The radio device of claim 11 wherein the estimator circuitry is operative to extend ends of the sequence of tones to produce the circular waveform extending continuously beyond a range of frequencies occupied by the sequence of tones.

15. A radio device comprising:
receiver circuitry configured to receive frequency waveforms limited to a band of frequencies, the frequency waveforms including a sequence of tones transmitted by a remote radio over a radio channel;
estimator circuitry configured to identify and estimate missing portions of the received frequency waveforms in the band of frequencies or outside the band of frequencies to produce a circular waveform in frequency domain by including locating one or more missing tones in the sequence of tones and estimating a replacement tone for each located missing tone from a linear combination of neighboring tones of the located missing tones; and
transformation circuitry operative to transform the circular waveform to produce a channel estimate for the radio channel in time domain.

16. The radio device of claim 15 further comprising a processing circuit in communication with the transformation circuitry and configured to switch from use of a long guard interval to a short guard interval for subsequent communication on the radio channel based on the channel estimate.

17. The radio device of claim 15 further comprising a processing circuit in communication with the transformation circuitry and configured to determine channel timing for the radio channel based on the received frequency waveforms and to adjust timing of the receipt of subsequent frequency waveforms using the determined channel timing.

18. The radio device of claim 15 further comprising a processing circuit in communication with the transformation circuitry and configured to adjust demodulation or decoding or both of subsequent frequency waveforms using the a channel estimate for the radio channel in the time domain.

* * * * *